UNITED STATES PATENT OFFICE.

CARL DUISBERG, OF ELBERFELD, GERMANY.

BLUE AZO COLORING-MATTER.

SPECIFICATION forming part of Letters Patent No. 388,185, dated August 21, 1888.

Application filed December 14, 1885. Serial No. 185,645. (Specimens.) Patented in Germany November 19, 1885, No. 38,802; in England November 24, 1885, No. 14,424, and in France December 19, 1885, No. 173,042.

*To all whom it may concern:*

Be it known that I, CARL DUISBERG, of Elberfeld, in the Empire of Germany, chemist, assignor to the FARBENFABRIKEN, VORMALS FRIEDR. BAYER & Co., have invented a new and useful Improvement in the Manufacture of Dye-Stuffs or Coloring-Matters, of which the following is a specification, the same having been patented to me or to my assignees with my knowledge and consent in Germany November 19, 1885, No. 38,802; in England November 24, 1885, No. 14,424, and in France December 19, 1885, No. 173,042.

My invention relates to the production of a new blue azo color for dyeing on cotton, wool, and silk by the action of tetrazo-diphenol-diethyl ether upon alpha-monosulpho-acid of alpha-naphthol, which is obtained by sulphonizing alpha-naphthol or by the decomposition of the alpha-diazonaphthylamin sulpho-acid by boiling.

In carrying out my process practically I proceed as follows: Ten (10) kilos diamidodiphenol-diethyl ether (diphenetidin) are dissolved in one hundred and fifty liters water and twenty (20) kilos of muriatic acid of the specific gravity of 1.161. To the solution so obtained and cooled by ice five (5) kilos sodium nitrite dissolved in water are gradually added. In this way a reddish-yellow solution of tetrazo-diphenoldiethyl ether is formed. The solution thus obtained is thereupon allowed to flow slowly into a solution of twenty kilos of the soda salt of alpha-naphthol alpha-mono sulpho-acid and ten (10) kilos soda to four hundred (400) liters of water. A dark violet-blue solution is formed, which is precipitated by common salt. After a short time filter and dry. In this way a product of the following composition is formed:

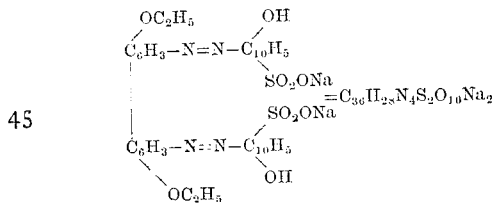

This represents in the dry state a black amorphous powder of a slight bronze hue, which shows approximately the same properties as the product gained in the same manner from the tetrazo-diphenoldimethyl ester, and described in the Letters Patent No. 357,273. It is the homologous product as already described, and differs only by the composition of $2(CH_2)$. It dissolves very easily in hot water, giving a violet color. By an alkaline lye it dissolves into a deep-red color; by concentrated sulphuric acid, into a deep indigo-blue color. It dyes cotton not mordanted in a boiling alkaline bath a deep blue, a little more red than the homologous product of Letters Patent No. 357,273, being fast to soap and mineral acids.

I am aware of the United States Letters Patent to Griess, Nos. 213,563 and 213,564, of March 25, 1879, and I do not claim the compounds there described.

What I claim as my invention, and desire to secure by Letters Patent, is—

The coloring-matter herein described, which is produced by the action of tetrazo-diphenoldiethyl ester (ether) upon the alpha-naphthol alpha-mono sulpho-acid, and which is a black amorphous powder with a bronze hue, forming a violet solution when dissolved in water, being changed with alkali to red, and with concentrated sulphuric acid produces a deep indigo-green-blue color, and dyes cotton not mordanted in an alkaline soap bath blue, fast to soap and mineral acids, differing from the homologous product of the Letters Patent No. 357,273 by the composition of $2(CH_2)$, substantially as described.

CARL DUISBERG.

Witnesses:
ANTHONY GREF,
WILLIAM A. POLLOCK.